United States Patent
Jarrier et al.

(10) Patent No.: US 8,440,002 B2
(45) Date of Patent: May 14, 2013

(54) LONG LIFE PYRAMIDAL FILTER FOR GAS TURBINE INLET SYSTEM

(75) Inventors: Etienne Rene Pascal Jarrier, Reading (GB); Paul Sherwood Bryant, Amesbury (GB)

(73) Assignee: General Electric Company, Schenectady, NY (US)

( * ) Notice: Subject to any disclaimer, the term of this patent is extended or adjusted under 35 U.S.C. 154(b) by 407 days.

(21) Appl. No.: 12/788,591

(22) Filed: May 27, 2010

(65) Prior Publication Data

US 2011/0290116 A1 Dec. 1, 2011

(51) Int. Cl.
*B01D 49/00* (2006.01)
(52) U.S. Cl.
USPC ............... 95/286; 95/256; 95/280; 95/483; 55/283; 55/337; 55/302; 55/484; 55/499
(58) Field of Classification Search ............ 95/256, 95/280, 483; 55/283, 302, 337, 499, 482, 55/484; 210/169
See application file for complete search history.

(56) References Cited

U.S. PATENT DOCUMENTS

| | | | |
|---|---|---|---|
| 3,343,520 A * | 9/1967 | Schwarz, Jr. | 119/419 |
| 4,206,054 A * | 6/1980 | Moore et al. | 210/167.23 |
| 4,536,200 A | 8/1985 | Reist | |
| RE32,185 E | 6/1986 | Copley | |
| 7,520,913 B2 | 4/2009 | Mills et al. | |
| 2005/0189286 A1 * | 9/2005 | Ferguson | 210/406 |
| 2006/0174598 A1 * | 8/2006 | Mills et al. | 55/499 |
| 2008/0092501 A1 * | 4/2008 | Sporre et al. | 55/493 |

OTHER PUBLICATIONS

"XLR Next Generation Air Filtration," Donaldson Filtration Solutions, 2004.

* cited by examiner

*Primary Examiner* — Robert Clemente
*Assistant Examiner* — Karla Hawkins
(74) *Attorney, Agent, or Firm* — Cooper Legal Group, LLC

(57) ABSTRACT

A filtration apparatus includes at least three filter elements for filtering fluid, and a frame having a pyramidal frustum configuration that has at least three sides. The frame includes a frame structure for supporting the filter elements at the sides such that the filtration apparatus has a pyramidal frustum configuration. The filtration apparatus may be part of a filtration assembly. The filtration apparatus may be utilized within an associated method.

14 Claims, 5 Drawing Sheets

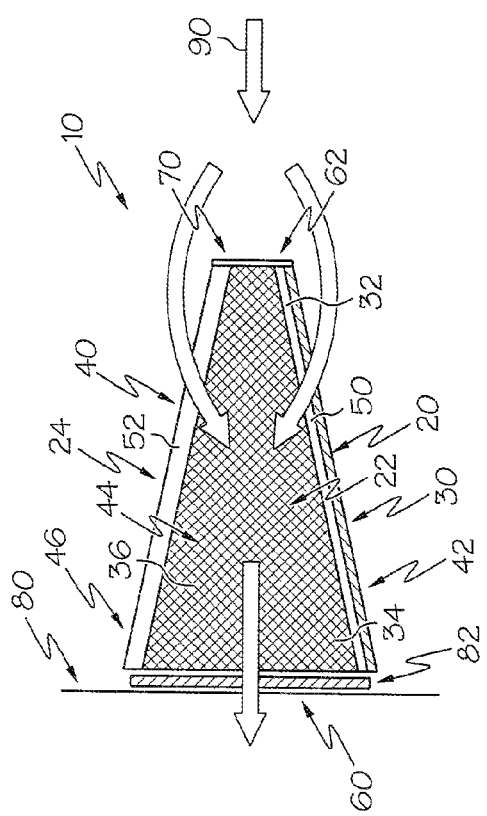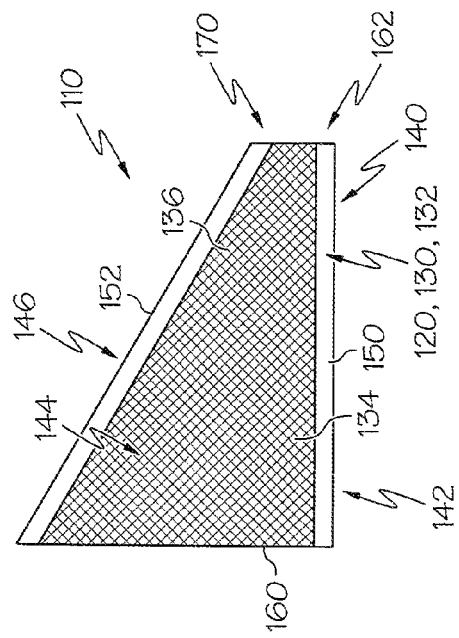

LONG LIFE PYRAMIDAL FILTER FOR GAS TURBINE INLET SYSTEM

BACKGROUND OF THE INVENTION

1. Field of the Invention

The invention relates generally to a filtration apparatus, and more particularly, to a filtration apparatus that has a pyramidal frustum shape.

2. Discussion of Prior Art

Filter elements may be used to provide clean fluid, such as air, to or from various devices. Such devices may include gas turbines. Filter elements may include mini-pleat filters and pulse cartridges. Mini-pleat filters have a limit to the amount of media surface that can be present since increased media depth may cause some limitation to the ability to pleat the media. Pulse cartridges have a relatively high pressure drop and may have complicated manufacturing methods as well as additional structure for holding filter elements in the cartridge. There are benefits for continual improvements in filter technologies so as to address these and other issues.

BRIEF DESCRIPTION OF THE INVENTION

The following summary presents a simplified summary in order to provide a basic understanding of some aspects discussed herein. This summary is not an extensive overview of the invention discussed herein. It is not intended to identify key/critical elements or to delineate the scope of such invention. Its sole purpose is to present some concepts in a simplified form as a prelude to the more detailed description that is presented later.

In accordance with one aspect the present invention provides a filtration apparatus that includes at least three planar filter elements, configured for filtering fluid, a frame having a pyramidal frustum configuration that has at least three sides, and a frame structure for supporting the planar filter elements at the sides such that the filtration apparatus has a pyramidal frustum configuration.

In accordance with another aspect the present invention provides a filtration assembly that includes a first filtration apparatus and a second filtration apparatus. Each filtration apparatus includes at least three planar filter elements, configured for filtering fluid, a frame, and a frame structure. The frame has a pyramidal frustum configuration that has at least three sides. The frame structure supports the filter elements at the sides such that the respective filtration apparatus has a pyramidal frustum configuration. The frame defines a first base opening and a second base opening. The first base opening of the first filtration apparatus is mounted facing the first base opening of the second filtration apparatus such that the first filtration apparatus and the second filtration apparatus form a bi-pyramidal frustum.

In accordance with another aspect the present invention provides a method of filtering a fluid with a filtration apparatus. The method includes providing at least three planar filter elements configured for filtering fluid, providing a frame having a pyramidal frustum configuration that has at least three sides, and providing a frame structure. The frame structure supports the planar filter elements at the sides such that the filtration apparatus has a pyramidal frustum configuration. The method includes drawing fluid in a first direction through a first base opening of the filtration apparatus. The method includes filtering the drawn fluid through the at least planar three filter elements to collect particulate matter.

BRIEF DESCRIPTION OF THE DRAWINGS

The foregoing and other aspects of the invention will become apparent to those skilled in the art to which the invention relates upon reading the following description with reference to the accompanying drawings, in which:

FIG. 2 is a side view of the filtration apparatus of FIG. 1 and shows a flow path;

FIG. 3 is a side view of a second example filtration apparatus;

DETAILED DESCRIPTION OF THE INVENTION

Figure 1:
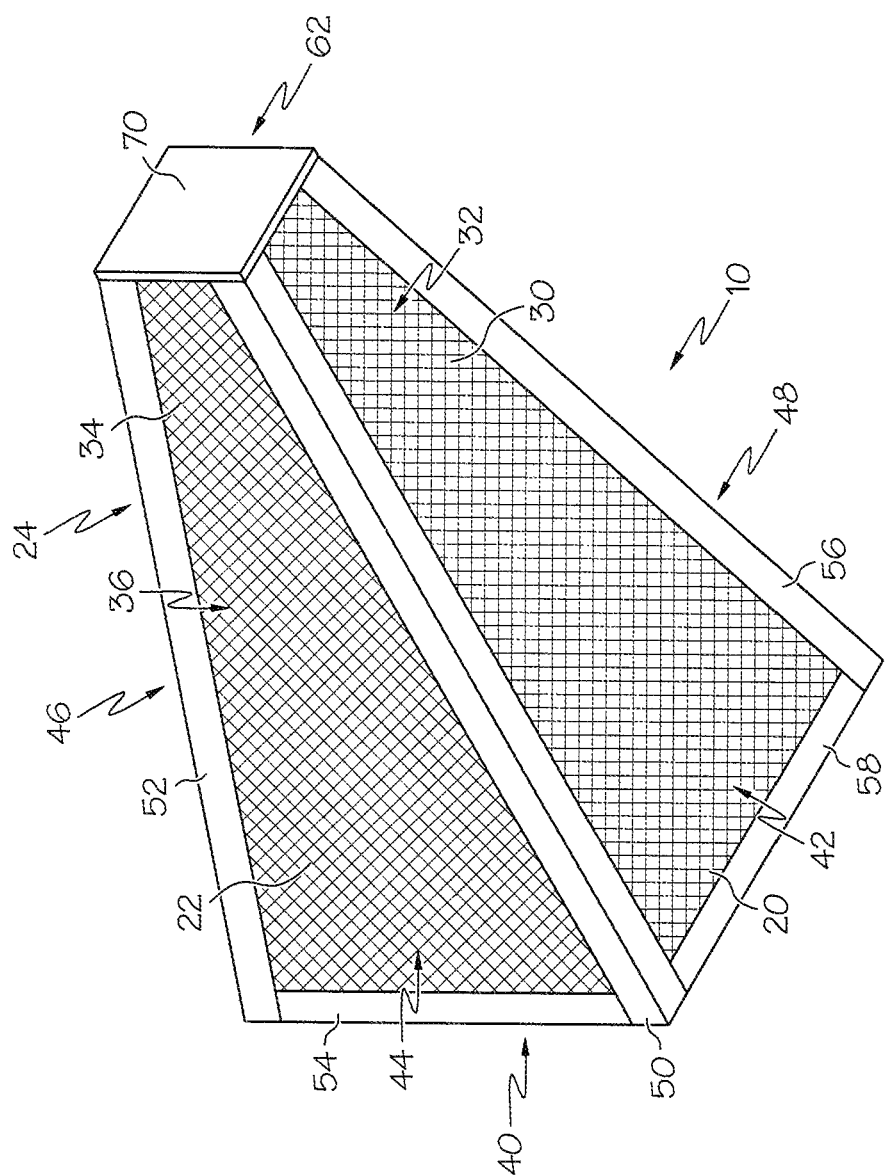
FIG. 1 is a perspective view of a first example filtration apparatus.

Example embodiments that incorporate one or more aspects of the invention are described and illustrated in the drawings. These illustrated examples are not intended to be a limitation on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

FIG. 1 illustrates a first example filtration apparatus 10 that includes at least three filter elements 20, 22 and 24. Each filter element (e.g., 20) is configured for filtering fluid, such as liquid, air, and/or gas. The liquid, air, and/or gas can be proceeding to a turbine, such as a gas turbine. Each filter element (e.g., 20) includes a filter media 30. The filter media 30 is configured to collect particulate material, including but not limited to dust, from the fluid flowing through the filter element 20. The filter media 30 can be formed from a variety of materials, such as fibers or a membrane, and can be formed by a variety of processes. The filter media 30 can include various types of media including but not limited to media that has been pleated and/or corrugated. In one example, the filter media 30 can be in the form of a "flat panel." The thickness of the filter media 30 when pleated can be approximately 50 mm. Of course, one or more aspects of the filter media 30, such as material, construction, configuration, thickness, etc. can be varied.

Each filter element (e.g., 20) may be a composite filter element and further includes a support structure 32 for supporting the filter media 30 and can help retain the filter media 30 in a given shape. In this example, the support structure 32 is mesh. HDPE, Nylon, and a variety of other materials with desired rigidity can also be provided as the support structure 32. The support structure 32 still allows fluid to pass there through.

The first example filtration apparatus 10 shown in FIG. 1 further includes a frame 40. The frame 40 can have a variety of shapes and configurations. The frame 40 in FIG. 1 has a configuration of a skeleton of pyramidal frustum such that the filtration apparatus 10 has a pyramidal frustum shape which has at least three sides and which tapers from one end to the other end. Specifically, the filtration apparatus 10 includes at least a plurality of side portions, such as a first side portion 42, a second side portion 44, and a third side portion 46, which collectively provide the pyramidal frustum shape. The other side portions include structure similar to the first side portion 42. Specifically, each side portion includes a filter element. For example, the second side portion 44 includes the second filter element 22. The third side portion 46 would include the third filter element 24 and so on. The filter elements 20, 22, and 24 can be planar though other examples can have other geometries. For example, the filter elements 20, 22, and 24 can be non-cylindrical and have some portions that are planar while other portions are non-planar.

In the shown example of FIG. 1 the filtration apparatus 10 has four sides. A fourth side portion 48 (indicated by the pointing arrowhead associated with reference number 48 in FIG. 1) of the filtration apparatus 10 is located between the first side portion 42 and the third side portion 46. Thus, the shape of the filtration apparatus 10 in the shown example is a four-sided pyramid with the apex truncated. In the shown example, the first side portion 42 refers to a lower side of the filtration apparatus 10 as shown in FIG. 1. Of course, any indication of first-fourth, top/bottom/side, etc. is merely for ease of identification.

In the shown example, the four side portions are of the same shape and/or symmetrical to each other. In other examples, the frame 40 could be configured differently to form a pyramidal frustum configuration having a different number of side portions. Some examples include three side portions, five side portions and six side portions. The side portions of the pyramidal frustum configuration can also include different shapes than those shown in FIG. 1 (e.g., different length, different width or different taper). The side portions of the pyramidal frustum configuration can also include varying shapes within any one configuration (e.g. different sides have different shapes). Accordingly, use of the term pyramidal frustum includes irregular shaped side portions and various side portions of a variety of shapes and orientations.

In the shown example, the frame 40 includes a plurality of members to define or bound each side portion 42, 44, 46, 48 of the filtration apparatus 10. In one example, the second side portion 44 is defined by members of the frame 40 that can include at least a first member 50, a second member 52, and a third member 54. The first member 50, the second member 52, and the third member 54 can each contact/receive an outer portion of the second filter element 22. The frame 40 can be made of any material having a range of rigidities and is stiff enough to hold the pleaded media. Examples of the material for the members 50, 52, 54 of the frame 40 can include but are not limited to aluminum, stainless steel, or plastic.

It is to be appreciated that each filter element (e.g., 20) is shaped to fit in accordance with the respective area bounded by the respective members of the frame 40. In the example shown in FIG. 1, each filter (e.g., 20) has a shape of a trapezoid area. Two edges of each filter (e.g., 20) are generally parallel, and the other two edges are non-parallel. As such, the width of each filter (e.g., 20) tapers from one end to the other.

Some portions of the frame 40 that define a side portion can be shared to also partially define another side portion. For example, the member 50 of the frame 40 that partially defines the second side portion 44 also partially defines the first side portion 42. Thus in the shown example, the first side portion 42 can include at least a fourth member 56, a fifth member 58, and the first member 50.

With regard to the members of the frame 40 receiving an outer portion of a respective filter element, it is to be appreciated that the members of the frame can be constructed/configured to hold, retain, affix, etc. the outer portions of the filter elements. Thus, the filter elements (e.g., 20-24) are held in place to be stationary relative to the frame 40. Also, the outer portions of the filter elements (e.g., 20-24) can be sealed or potted to the frame so that particulate matter does not bypass the filter elements. The filter element 20 can include the filter media 30 being on the exterior of the support structure 32 or the support structure 32 being on the exterior of the filter media 30.

The pyramidal frustum configuration of filtration apparatus 10, as provided by the frame 40, can further include a first base opening 60 (see FIG. 2) and a second base opening 62. Some of the plurality of members can extend from one base opening to the other base opening, such as the first member 50, the second member 52, and the fourth member 56 in this example. The first base opening 60 can be larger than the second base opening 62, as shown in the example of FIG. 1. The second base opening 62 can be covered with a cap 70. The cap 70 does not allow fluid to pass therethrough. A portion of the cap 70 can also contact an outer portion of the filter elements (e.g., 20-24) and/or the frame 40, and may be sealed/potted thereto. Thus, the cap 70 may provide functions such as retaining, support and sealing. In one example, the cap 70 can have a thickness of up to approximately 0.5 mm to 20 mm. The width or length of the cap can be approximately 0.1 m to 0.2 m.

It is to be appreciated that the frame 40 and cap 70 are sized and configured in correspondence with the size and configuration of the filter elements (e.g., 20-24). As such, the dimensions, such as length and width may be varied. In one example, the overall length of the pyramidal frustum configuration of the filtration apparatus 10 can be approximately 1.25 m. In another aspect of the example, each filter media (e.g., 30) can have a face surface of approximately 1.25 m$^2$. It is further contemplated that an example of surface filtration area for the entire filtration apparatus 10 may reach up to 50 m$^2$.

With regard to considerations of size, in general, with the pyramidal frustum configuration it may be possible to use a thicker filter media since the filter media on one side portion will typically not interfere with any of the other side portions. The thickness of the filter media (e.g., 30) can also be greater than in a mini-pleat product. A mini-pleat product typically includes adjacent filter elements that converge to a single point. The convergence and close proximity of the filter elements in the mini-pleat product results in limiting the thickness of the filter elements. The relatively thicker filter media in the subject apparatus can help the filtration apparatus achieve a higher dust holding capacity, in comparison to a mini-pleat product. A higher dust holding capacity will also result in a longer life for the filter elements.

In addition, the filtration apparatus 10 can further include a holding frame 80 (highly schematized). The holding frame 80 can be provided abutting the filtration apparatus 10. The holding frame 80 can be any structure that receives and supports the filtration apparatus 10. Also, the filtered fluid (e.g., air) passes through the holding frame 80 (i.e., from one side to the other) after transiting through the filtration apparatus 10. The holding frame 80 can also be configured to ensure that fluid only flows through the first base opening 60. The holding frame 80 can also be configured to receive and support a plurality of filtration apparatuses. A sealing member 82 can also be provided to ensure that fluid flows only through the first base opening 60 and not in other directions as the fluid escapes the filtration apparatus 10. For example, the holding frame 80 may only have an opening at the location of the first base opening 60.

An example flow of fluid 90 for the filtration apparatus 10 of FIG. 1 is shown in FIG. 2. In this example, the cap 70 prevents fluid from entering the second base opening 62.

Accordingly, the fluid flows 90 around the cap 70 and through the filter media (e.g., 30, 34) on a plurality of side portions (e.g., 42, 44, and 46) of the filtration apparatus 10 and the fluid then flows 90 through the first base opening 60. Thus, a method of filtering a fluid is provided.

Figure 7:
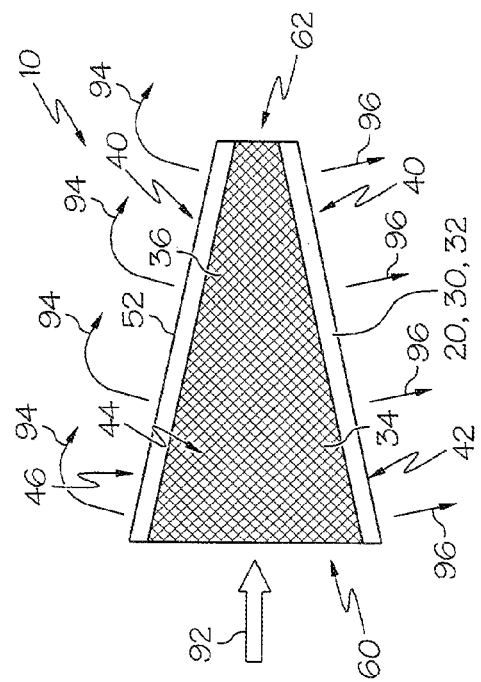
FIG. 7 is a side view of the filtration apparatus of FIG. 1 with a reverse flow of fluid applied.

The method of filtering a fluid can also further include the step of cleaning the filtration apparatus 10 by applying a reverse flow pulse of fluid, such as a reverse air jet pulse, in a second flow direction 92 through the first base opening 60 to remove particulate matter from the filter media 30. An example of the application of the reverse air jet pulse in a first example filtration apparatus 10 is shown in FIG. 7. The second direction 92 shown in FIG. 7 is different or opposite the first direction 90 shown in FIG. 2. The filter media 30 and/or the support structure 32 are made of sufficient strength to withstand the pressure created by the reverse air jet pulse to remove the particulates from the filter media 30. The reverse air jet pulse applied in the second direction 92 will create a particulate motion 94 (i.e., movement of particulate matter) along the third side portion 46 and a particulate motion 96 along the first side portion 42.

A second example filtration apparatus 110 is shown in FIG. 3. In general, the second example is similar to the first example. As such, corresponding structures are referenced via the use of similar numbers but with the addition of a one hundred to the previously used numbers (i.e., addition of "1" in the hundreds place). The second example filtration apparatus 110 also includes at least one filter element 120 that includes a filter media 130 and a support structure 132 which may be similar to corresponding aspects within the first example. The second example filtration apparatus 110 also includes a frame 140. The frame 140 is configured such that the second filtration apparatus 110 includes a plurality of side portions, such as a first side portion 142, a second side portion 144, and a third side portion 146. The second filtration apparatus 110 can include any number of side portions with respective filter elements. For example, a second filter element is also shown in this example on the second side portion 144 and includes a second filter media 134 and a second support structure 136. In the example shown, the second filtration apparatus 110 further includes a fourth side portion. The second filtration apparatus 110 can a different number of side portions including but not limited to three, five, or six side portions.

The frame 140 in the second example of FIG. 3 can include a plurality of members, such as a first member 150, a second member 152, and a third member (not shown). A cap 170 also extends over a second base opening 162. The second member 152 is mounted at an angle relative to a horizontal line extending through the filtration apparatus 110. The angle for the second member 152 is larger in contrast to the angle provided for the second member 52 relative to a horizontal line through the first example filtration apparatus 10 of FIG. 1. The angle for one of the plurality of members, such as the first member 150 or the second member 152, can be any angle of 90° or less than relative to the horizontal line. The first member 150 or the second member 152 can also be mounted relatively horizontal. It is to be appreciated that each filter element (120) has an area shape that corresponds to the shape provided by the frame 140. Some filter elements may have trapezoidal shape with non-parallel sides. Some filter elements may be rectangular. Thus, the second example (FIG. 3) has less symmetry than the first example (FIG. 1). However, the second example could be mounted and/or utilized similar to the first embodiment.

In another example, both the first member 150 and the second member 152 can be mounted at larger angles relative to a horizontal line, as opposed to one of the members being relatively horizontal. In further examples, the first member 150, the second member 152, and the third member (not shown) can each be mounted at various angles relative to each other.

A reverse air jet pulse can also be applied to the second example filtration apparatus 110 of FIG. 3 for cleaning. The mounting angles for the first member 150 and the second member 152 can result in a higher efficiency for the expulsion of dust and particulate matter than the efficiency of the first example filtration apparatus 110. For example, the particulate particle motion (not shown) along the third side portion 146 will be less likely to result in particles or dust falling back onto the filter media itself. The efficiency for the expulsion of dust can be improved in comparison due to the orientation of the second member 152 being closer to vertical than the second member 52 in FIG. 2 and FIG. 7. Accordingly, the reverse air jet pulse exerts a force more directly upon each portion of the second member 152 and the dust is less likely to fall back onto the filter media itself in comparison with the second member 52 that is in a substantially horizontal orientation.

Figure 4:
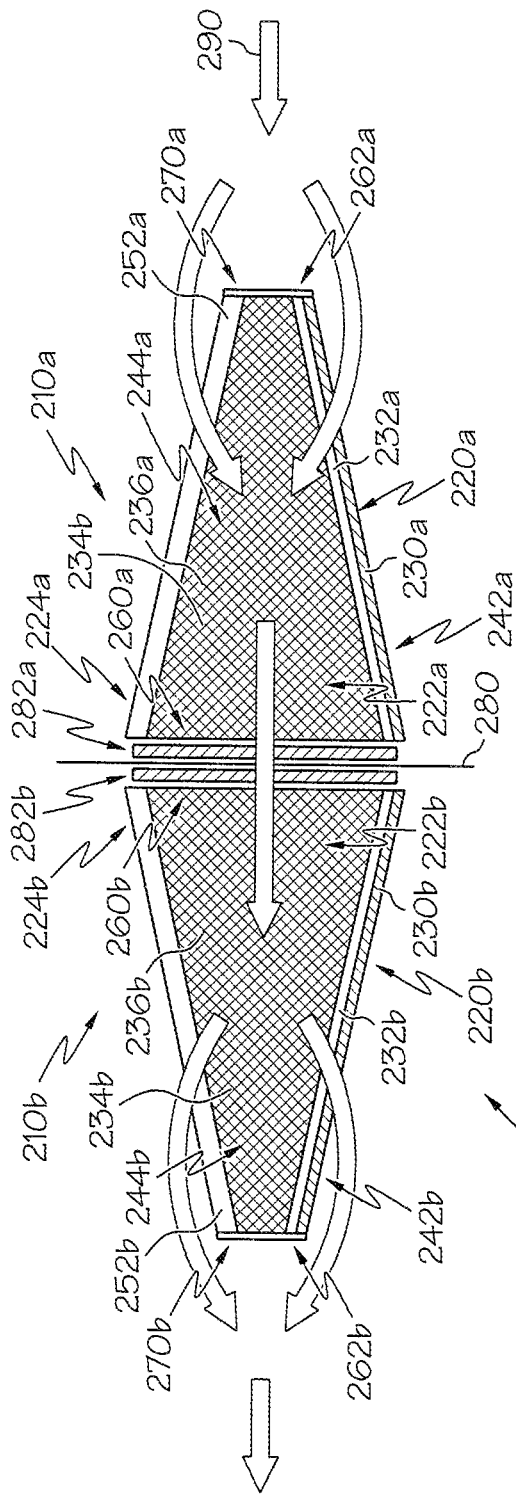
FIG. 4 is a side view of a first example filtration assembly that includes a first filtration apparatus and a second filtration apparatus.

A first example filtration assembly 200 is shown in FIG. 4. The first example filtration assembly 200 includes a first filtration apparatus 210a and a second filtration apparatus 210b. In general, the first filtration apparatus 210a and/or the second filtration apparatus 210b may be similar or identical to the previously discussed embodiments. In the shown example of FIG. 4, the first filtration apparatus 210a and the second filtration apparatus 210b are similar to the first example shown in FIG. 1. As such, corresponding structures are referenced via the use of similar numbers but with the addition of a two hundred to the previously used numbers (i.e., addition of "2" in the hundreds place). Also, the suffix "a" and the suffix "b" are added to indicate similar structures for the first filtration apparatus 210a and the second filtration apparatus 210b. Of course, the filtration assembly 200 may include at least one different filtration apparatus.

The shown example first filtration apparatus 210a and the second filtration apparatus 210b each include at least three filter elements 220a, 222a, 224a, 220b, 222b, 224b where each filter element 220a, 222a, 224a, 220b, 222b, 224b is configured for filtering fluid. Each of the filter elements 220a, 222a, 224a, 220b, 222b, 224b includes a filter media 230a, 234a, 230b, 234b and a support structure 232a, 236a, 232b, 236b. The first filtration apparatus 210a and the second filtration apparatus 210b each further include a frame 240a, 240b. The overall shape of each filtration apparatus 210a, 210b is a pyramidal frustum with a plurality of side portions 242a, 244a, 242b, 244b a first base opening 260a, 260b, and a second base opening 262a, 262b, where the plurality of side portions has the at least three filter elements 220a, 222a, 224a, 220b, 222b, 224b. Each frame 240a, 240b can include a plurality of members 252a, 252b that bound side portion 242a, 244a, 242b, 244b of the first filtration apparatus 210a and the second filtration apparatus 210b. A first base opening 260a, 260b can be larger than the second base opening 262a, 262b. Caps 270a, 270b can cover the second base opening 262a, 262b.

In the first example filtration assembly 200, the first base opening 260a of the first filtration apparatus 210a is mounted facing the first base opening 260b of the second filtration apparatus 210b such that the first filtration apparatus 210a and the second filtration apparatus 210b form a bipyramidal frustum. In addition, the filtration assembly 200 can further include a holding frame 280 (highly schematized). The holding frame 280 can be provided abutting the filtration apparatuses 210a, 210b. The holding frame 280 can be any structure that receives and supports the filtration apparatuses 210a, 210b and to allow fluid flow there-through. The holding frame 280 can also be configured to ensure that fluid only flows through each of the first base openings 260a, 260b. For example, the holding frame 280 may only have an opening the location of the first base openings 260a, 260b. A sealing member 282a, 282b can also be provided to ensure that fluid flows only through the first base opening 260a, 260b and not in other directions as the fluid escapes the filtration apparatus 210a.

An example flow of fluid 290 for the first example filtration assembly 200 is also shown in FIG. 4. Each cap 270a, 270b is configured to prevent fluid flow through the respective second base opening 262a, 262b to force filtration through the filter media 230a, 234a, 230b, 234b. In this example, the cap 270a of the first filtration apparatus 210a prevents fluid from entering the second base opening 262a. Accordingly, the fluid flows 290 around the second base opening 262a and through the filter media 230a on a plurality of side portions 242a, 244a of the first filtration apparatus 210a and the fluid then flows through the first base opening 260a. After the fluid flows through the first base opening 260a of the first filtration apparatus 210a, the fluid then flows 290 through the first base opening 260b of the second filtration apparatus 210b. The cap 270b of the second filtration apparatus 210b prevents fluid from entering the second base opening 262b. Accordingly, the fluid flows 290 around the second base opening 262b and through the filter media 230b on a plurality of side portions 242b, 244b of the second filtration apparatus 210b and the fluid then flows through the first base opening 260b. Thus, a method of filtering is provided.

Figure 5:
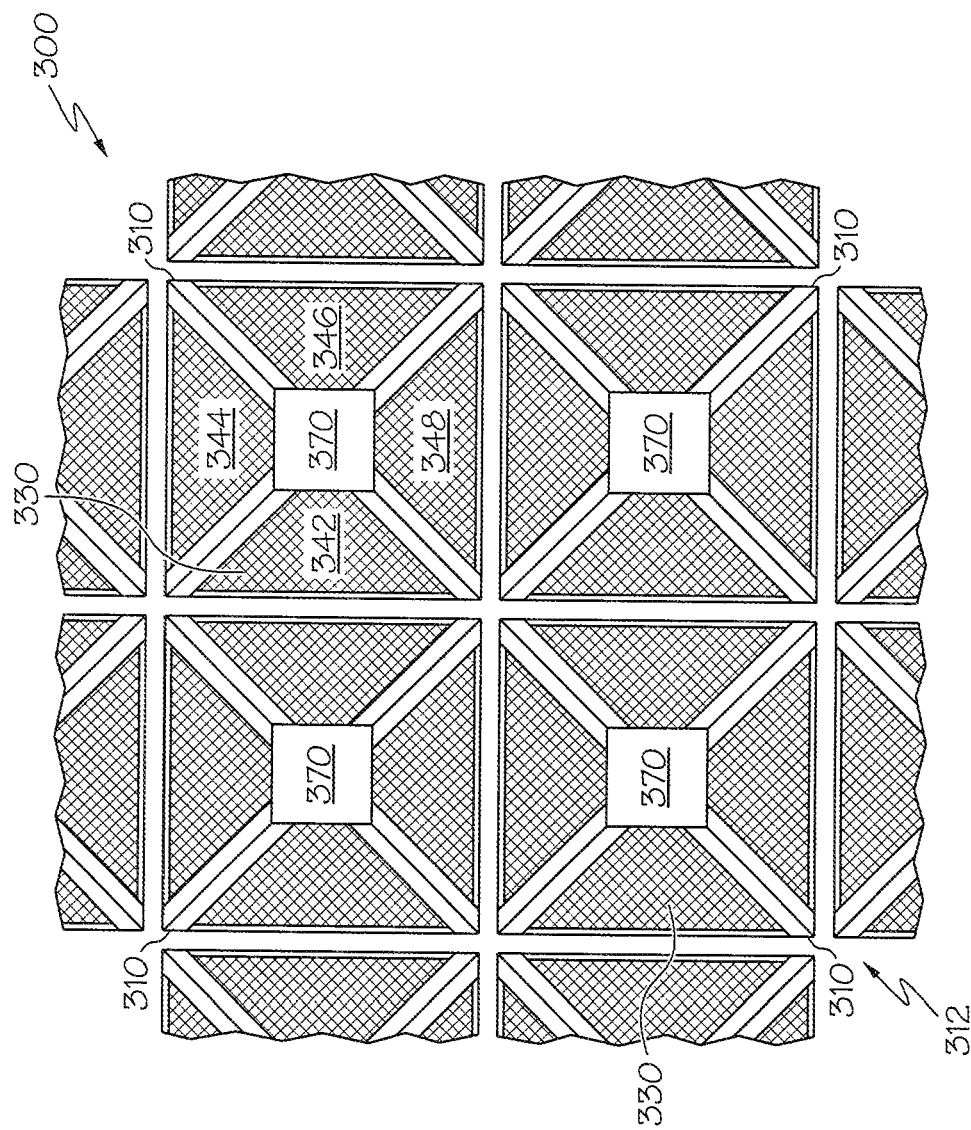
FIG. 5 is an end view of a second example filtration assembly that includes a plurality of filtration apparatuses in a filter house.

FIG. 5 shows a partial view of a second example filtration assembly 300. The second example filtration assembly 300 provides a plurality of filtration apparatuses 310 being used together, such as in a filter house 312. Each filtration apparatus 310 can include any of the aspects described or shown with regards to FIGS. 1-4. In the shown example of FIG. 5, the filtration apparatus 310 is similar to the first example shown in FIG. 1. As such, some corresponding structures are referenced via the use of similar numbers but with the addition of a three hundred to the previously used numbers (i.e., addition of "3" in the hundreds place). The filtration apparatus 310 can be provided where each of four side portions 342, 344, 346, 348 are oriented with one side portion located either horizontally or vertically. Each side portion includes a filter element and a filter media, such as the filter media 330 on the first side portion 342.

Figure 6:
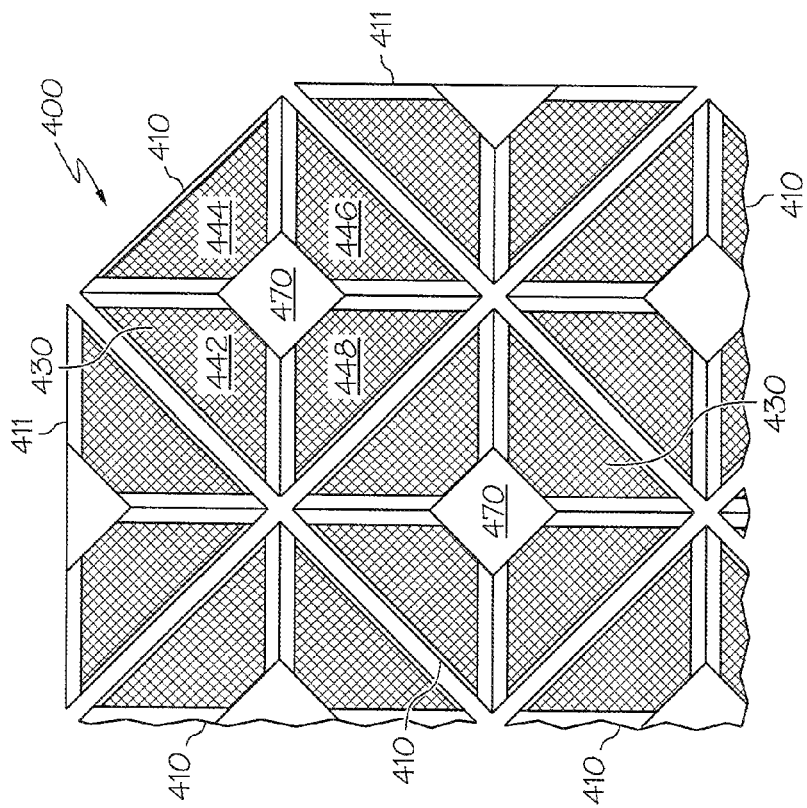
FIG. 6 is an end view of a third example filtration assembly that includes a plurality of filtration apparatuses in a filter house.

FIG. 6 shows a third example filtration assembly 400. The third example filtration assembly 400 provides a plurality of filtration apparatuses 410 being used together, such as in a filter house 412. The filtration apparatus 410 can include any of the aspects described or shown with regards to FIGS. 1-4. In the shown example of FIG. 6, the filtration apparatus 410 is similar to the first example shown in FIG. 1. As such, some corresponding structures are referenced via the use of similar numbers but with the addition of a 400 hundred to the previously used numbers (i.e., addition of "4" in the hundreds place). Each filtration apparatus 410 is oriented such that the side portions 442, 444, 446, 448 of the frame 440 are situated at an angle relative to a horizontal line. In this example, each filtration apparatus 410 is rotated 45 degrees relative to the filtration apparatuses 310 in the second example filtration assembly 300.

A number of other examples can also be provided with any other angle or orientation for each filtration apparatus 410. Different orientations are desirable depending on the desired angle for particulate matter to be filtered or released from the filter media 430. In still further examples, different portions of the filter house 412 can be inverted at various angles. In yet further examples, half-size filtration apparatuses 411 can also be provided in the assembly, as well as other partial sizes for the pyramidal frustum configurations.

As shown in FIGS. 2, 4, and 7, methods of filtering a fluid with the example filtration apparatuses 10, 110, 210a, 210b, 310, 410 described above are provided. The method includes the step of drawing fluid in a first flow direction 90, 290 such as the directions shown in FIG. 2 and FIG. 4, through a first base opening 60 of the filtration apparatus 10 that has a frame 40 having a pyramidal frustum configuration. The method further includes the step of filtering the drawn fluid through at least three side portions of the pyramidal frustum configuration, where the at least three side portions include filter media 30, 34 to collect particulate matter. The methods of filtering the fluid using the example filtration apparatus can also be performed with either a static filter or a pulse filter. By filtering the drawn fluid through all sides of the pyramidal frustum configuration, such as three or more sides, the pressure loss experienced by each filter element 20 can be less than in the situation where filter elements 20 are only located on a first side and a second side opposite the first side of a pulse cartridge product. Reducing the pressure loss also helps to improve an efficiency of a gas turbine and its performance.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A filtration apparatus including:
   at least three planar filter elements for filtering fluid; and
   a frame having a pyramidal frustum configuration that has at least three sides and first and second base openings;
   a frame structure for receiving and supporting the planar filter elements at the sides such that the filtration apparatus has a pyramidal frustum configuration; and
   a cap located at the second base opening of the pyramidal frustum configuration to block fluid flow through the second base opening, with the first base opening permitting fluid flow through the first base opening.

2. The filtration apparatus of claim 1, wherein the at least three filter elements includes more than three filter elements.

3. The filtration apparatus of claim 1, wherein each of the filter elements includes filter media the filter media of the at least three filter elements has an area of approximately 50 m².

4. The filtration apparatus of claim 1, wherein each of the filter elements includes filter media and the filter media of at least one of the filter elements has a thickness of 50 mm.

5. The filtration apparatus of claim 1, wherein each of the filter elements includes a support structure.

6. A filtration assembly including:
   a first filtration apparatus and
   a second filtration apparatus
   each filtration apparatus including:
      at least three planar filter elements for filtering fluid; and
      a frame having a pyramidal frustum configuration that has at least three sides,
      a frame structure for supporting the filter elements at the sides such that the respective filtration apparatus has a pyramidal frustum configuration, and the frame defining a first base opening and a second base opening;
   wherein the first base opening of the first filtration apparatus is mounted facing the first base opening of the second filtration apparatus such that the first filtration apparatus and the second filtration apparatus form a bi-pyramidal frustum.

7. The filtration assembly of claim 6, wherein each first base opening is larger than the second base opening.

8. The filtration assembly of claim 6, wherein each filtration apparatus further including a cap located at the second base opening configured to prevent fluid flow through the second base opening.

9. The filtration assembly of claim 6, wherein each of the filter elements includes filter media for each filtration apparatus the filter media of the at least three filter elements has an area of approximately 50 m².

10. The filtration assembly of claim 6, wherein each of the filter elements includes filter media the filter media of at least one of the filter elements has a thickness of 50 mm.

11. The filtration assembly of claim 6, wherein each of the filter elements includes a support structure.

12. The filtration assembly of claim 6, wherein each frame includes a plurality of members extending between each first base opening and each second base opening and where one of the plurality of members has an angle of up to 90° relative to a horizontal line.

13. A method of filtering a fluid with a filtration apparatus, the method including:
    providing at least three planar filter elements for filtering fluid;
    providing a frame having a pyramidal frustum configuration that has at least three sides and first and second base openings,
    providing a frame structure for receiving and supporting the planar filter elements at the sides such that the filtration apparatus has a pyramidal frustum configuration;
    providing a cap located at the second base opening of the pyramidal frustum configuration to block fluid flow through the second base opening;
    drawing fluid in a first direction through a first base opening of the filtration apparatus and
    filtering the drawn fluid through the at least planar three filter elements to collect particulate matter.

14. The method of claim 13, further including the step of cleaning the filtration apparatus by applying a reverse pulse of fluid in a second direction through the first base opening to remove particulate matter from the filter media, wherein the second direction is opposite the first direction.

* * * * *

UNITED STATES PATENT AND TRADEMARK OFFICE
CERTIFICATE OF CORRECTION

PATENT NO. : 8,440,002 B2  Page 1 of 1
APPLICATION NO. : 12/788591
DATED : May 14, 2013
INVENTOR(S) : Jarrier et al.

It is certified that error appears in the above-identified patent and that said Letters Patent is hereby corrected as shown below:

On the Title Page, in Item (75), under "Inventors", in Column 1, Line 1,
delete "Etienne Rene" and insert -- Etienne René --, therefor.

Signed and Sealed this
Twenty-fifth Day of June, 2013

Teresa Stanek Rea
*Acting Director of the United States Patent and Trademark Office*